(12) United States Patent
Simske et al.

(10) Patent No.: US 10,679,204 B2
(45) Date of Patent: Jun. 9, 2020

(54) IMAGING A PACKAGE TO IDENTIFY CONTENTS ASSOCIATED WITH THE PACKAGE

(71) Applicant: Hewlett-Packard Development Company, L.P., Houston, TX (US)

(72) Inventors: Steven J. Simske, Fort Collins, CO (US); Tong Zhang, Palo Alto, CA (US); Ed Costello, Palo Alto, CA (US); Gideon Amir, Ness Ziona (IL); Karl Walters, San Diego, CA (US)

(73) Assignee: Hewlett-Packard Development Company, LP., Spring, TX (US)

( * ) Notice: Subject to any disclaimer, the term of this patent is extended or adjusted under 35 U.S.C. 154(b) by 0 days.

(21) Appl. No.: 16/098,028

(22) PCT Filed: Jul. 21, 2016

(86) PCT No.: PCT/US2016/043276
§ 371 (c)(1),
(2) Date: Oct. 31, 2018

(87) PCT Pub. No.: WO2018/017091
PCT Pub. Date: Jan. 25, 2018

(65) Prior Publication Data
US 2019/0156316 A1    May 23, 2019

(51) Int. Cl.
*G06Q 20/20*  (2012.01)
*G06Q 30/02*  (2012.01)
(Continued)

(52) U.S. Cl.
CPC ............. *G06Q 20/208* (2013.01); *G06K 7/10* (2013.01); *G06K 7/10722* (2013.01);
(Continued)

(58) Field of Classification Search
CPC .. G06Q 20/208; G06Q 20/209; G06K 7/1413; G06K 7/10722; G07G 1/0054; G07G 1/0063
See application file for complete search history.

(56) References Cited

U.S. PATENT DOCUMENTS 7,416,119 B1 *  8/2008  Inderrieden ........ G01G 19/4144
                                                     235/378
8,292,173 B2  10/2012  Yturralde et al.
(Continued)

FOREIGN PATENT DOCUMENTS

WO    WO-03102755 A1    12/2003

OTHER PUBLICATIONS

Packaging and Shipping Inventory to Amazon; Apr. 3, 2015; https://images-na.ssl-images-amazon.com/images/G/01/fba-help/QRG/FBA-Shipping-Inventory-to-Amazon.pdf.

*Primary Examiner* — Laura A Gudorf
(74) *Attorney, Agent, or Firm* — Fabian VanCott

(57) ABSTRACT

Imaging a package to identify contents associated with the package includes with a camera of a point of sale (POS) system, imaging the package, where an identical identification mark is located on all sides of the package such that when an image of the package is captured, an image of the identification mark appears in the image irrespective of an orientation of the package to the camera and with a database, identifying the contents associated with the package based on the identification mark from the image.

20 Claims, 8 Drawing Sheets

(51) Int. Cl.
*G06K 7/10* (2006.01)
*G07G 1/00* (2006.01)
*G06K 7/14* (2006.01)

(52) U.S. Cl.
CPC ......... *G06K 7/1413* (2013.01); *G06Q 20/209* (2013.01); *G06Q 30/0207* (2013.01); *G07G 1/0045* (2013.01); *G07G 1/0054* (2013.01)

(56) References Cited

U.S. PATENT DOCUMENTS

| | | |
|---|---|---|
| 8,418,914 B2 | 4/2013 | Cormack et al. |
| 2002/0158137 A1 | 10/2002 | Grey et al. |
| 2003/0219122 A1 | 11/2003 | Ramirez et al. |
| 2008/0011846 A1* | 1/2008 | Cato .................. G06K 7/10851 235/435 |
| 2015/0193761 A1* | 7/2015 | Svetal .................. G06Q 20/208 705/23 |
| 2015/0324937 A1 | 11/2015 | Callahan |
| 2017/0124422 A1* | 5/2017 | Tada .................. G06K 9/00201 |

* cited by examiner

IMAGING A PACKAGE TO IDENTIFY CONTENTS ASSOCIATED WITH THE PACKAGE

BACKGROUND

A point of sale (POS) system is a device that aids a retailer in the selling of products to a customer. For example, at time of purchase, barcodes printed on packages associated with the products are read by the POS system to identify the products being sold to the customer. The POS system prepares an invoice that identifies all the products sold to the customer as well as a price for each of the products. After receiving payment from the customer for the products sold, a receipt is issued via the POS system to the customer. The receipt is a printed hardcopy of the invoice that shows proof as to the products sold to the customer and the price of each product.

BRIEF DESCRIPTION OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1:
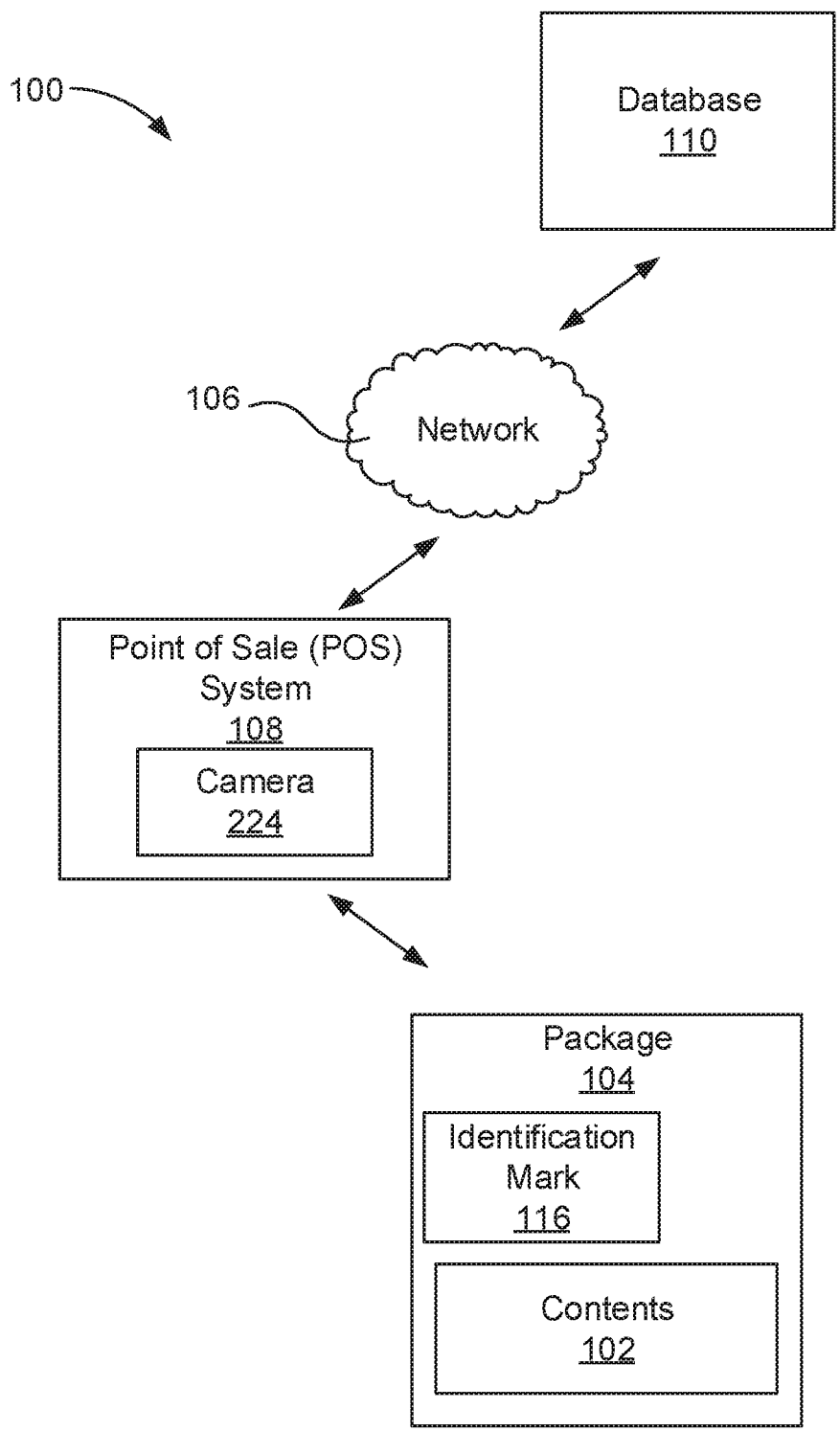
FIG. 1 is a diagram of a system for imaging a package to identify contents associated with the package, according to one example of principles described herein.

As mentioned above, a point of sale (POS) system is a device that identifies products sold to a customer at time of purchase. Many POS systems use customized hardware and software components tailored to meet the needs of a particular retailer. Such hardware and software components includes optical scanners, touch screens, credit card readers, printers, specific workflows designed to meet the needs of the retailer, as well as other hardware and software components.

The optical scanners of a POS system are used to read a barcode located on the package. The barcode is an optical machine-readable representation of data relating to contents of a package to which it is attached. The barcode is associated with a stock keeping unit (SKU) such that the POS system can identify the contents of the package once the barcode is read by the POS system. Barcodes include, but are not limited to, linear barcodes, two dimensional codes using rectangles, dots, hexagons, other geometric patterns, a universal product code (UPC), a quick response (QR) code, or other barcodes.

At time of purchase, the user manually determines the location of the barcode on the package. The barcode is often located on a single side of a package. For example, the location of the barcode on a cuboid package is on the bottom of the package. For the POS system to identity the contents of the package, a user, such as a cashier or a customer, manually aligns the barcode on the package with the optical scanners of the POS system. Once the user manually aligns the barcode on the package with the optical scanners of the POS system, the POS system reads the barcode to identify the contents of the package. This manual process can be challenging because the location of barcodes on packages can vary from package to package. As a result, manually determining the locations of the barcodes for each package can be a time-consuming process.

If a barcode is damaged or worn, the optical scanners of the POS system may not be able to read the barcode. As a result, the user manually inputs the information associated with the barcode into the POS system for the POS system to identify the contents of the package. This manual process can be time-consuming.

Another method to identify contents of a package is to print a watermark on a side of the package such that the POS system can recognize the watermark at time of purchase. In this example, the watermark is a representation of data relating to the contents of the package to which it is attached. As a result, the watermark can be used to identify the contents of the package. However, the watermark is often covertly located on the package. This makes it difficult for the POS system to recognize a watermark on a side of a package since it is not visible.

The principles described herein include a method for imaging a package to identify contents associated with the package. Such a method includes with a camera of a POS system, imaging the package, where an identical identification mark is located on all sides of the package such that when an image of the package is captured, an image of the identification mark appears in the image irrespective of an orientation of the package to the camera and with a database, identifying the contents associated with the package based on the identification mark from the image.

Such a method uses object recognition technology in combination with a specific approach to variable data printing (VDP) to provide a robust way of identifying contents associated with a package. As will be described below, VPD is used to label all sides of a package with an identification mark. This overcomes the challenges of how to label a package such that a camera or other image capturing device aimed at the package from any direction will be able to identify the contents of the package. This provides an advantage for the user because the user does not need to manually determine the location of the barcode on the package and manually align the barcode to the optical scanners of the POS system. The POS system can identify the contents of the package since the POS system can recognize a package, via the identification mark, from a variety of angles when capturing an image of package.

In some examples, the identification mark is the minimum needed to identify contents associated with a package. However, the method also uses the capability to reliably differentiate the contents of packages with the same identification mark based on dimensions of the packages. In such an example, the identification mark is used to identify a category associated with contents of the package. The category is, for example, medication manufactured by a company. Since the company manufactures several types of medications and different doses of the medications, to differentiate the contents (i.e. the type of medication and dose) associated with the packages in that category, the dimensions of the packages are determined by the method. In this example, the dimensions of the packages for the category are unique such that the contents of a package can be identified via a combination of the identification mark and the dimensions of the package.

Such a method can allow users to avoid using the barcode altogether so that the space on the package where the barcode is located can be used for other packaging information. However, in some examples, the method augments the use of barcodes. For example, the barcode can be used to identify the content of the package when the barcode appears in the image captured by the POS system. Since an identification mark is printed on all sides of the package, this allows the method to identify the contents of the package if the barcode is damaged or worn. As a result, having an identification mark located on each side of the package allows the package to be more damage resilient and potentially more tamper-resistant, In the present specification and in the appended claims, the term "package" means a device used for enclosing and/or protecting contents for distribution, storage, sale, and use. A package is defined by dimensions such as a length, width, and depth corresponding to sides of the package.

In the present specification and in the appended claims, the term "contents" means a customer good that is associated with a package. Contents are, for example, electronic device, clothes, furniture, foods, beauty products, cleaning products, medicine, and other contents. The contents can be enclosed and/or protected by the package.

In the present specification and in the appended claims, the term "identification mark" means a mechanism located on each side of a package to aid a POS system in identifying contents associated with the package. In an example, the identification mark is a logo, a color, a shape, a texture, at least one character, an image, or combinations thereof that are printed onto each side of the package.

In the present specification and in the appended claims, the term "information mark" means a mechanism located on at least one side of a package to aid a POS system in identifying additional information associated with contents of the package, a retailer, or a user's account. The information mark is printed on at least one of the sides of the package. The additional information includes, for example, how to redeem reward points associated with the retailer, how to sign up for a credit card associated with the retailer, other additional information, or combinations thereof.

In the present specification and in the appended claims, the term "valid" means a usable image of a package captured via a camera. In an example, the image is valid when an analysis identifies the identification mark from the image and determines the dimensions of the package from the image.

In the present specification and in the appended claims, the term "invalid" means an unusable image of a package captured via a camera. The image is invalid when an analysis does not identify the identification mark from the image or does not determine the dimensions of the package from the image.

Further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

While specific examples with respect to using a POS system to identify contents associated with a package at time of purchase in a retail store are given, the technology and methods can be deployed in other business capacities. For example, the technology and methods can be deployed in manufacturing facilities, sorting facilities, packaging facilities, shipping facilities, or other facilities. The technology and methods can be tailored to suit the needs of those specific facilities.

FIG. 1 is a diagram of a system for identifying contents of a package, according to one example of principles described herein. As will be described below, a POS system (108) is in communication with a network (106). The POS system (108) includes a camera (224) to, image a package (104), where an identical identification mark (116) is located on all sides of the package (104) such that when an image of the package (104) is captured, an image of the identification mark (116) appears in the image irrespective of an orientation of the package (104) to the camera (224). Further, the system (100) includes a database (110) to identify the contents (102) associated with the package (104) based on the identification mark (116) from the image.

As illustrated, the system (100) includes a package (104). The package (104) is a device used for enclosing and/or protecting contents (102) for distribution, storage, sale, and use. As will be described in other parts of this specification, the package (104) is defined by dimensions such as a length, width, and depth corresponding to sides of the package (104). In some examples, the dimensions of the package (104) are unique such that when the POS system (108) captures an image of the package (104), the package (104) can be distinguished from all other packages with the same identification mark (116) based on the dimensions of the package (104).

The package (104) includes contents (102). The contents (102) are a customer good that is associated with the package (104). Contents (102) are, for example, electronic device, clothes, furniture, foods, beauty products, cleaning products, and other contents. The contents (102) can be enclosed and/or protected by the package (104).

As illustrated, the package (104) includes an identification mark (116). The identification mark (116) is a mechanism located on each side of the package (104) to aid the POS system (108) in identifying contents (102) associated with the package (104). For example, if the package (104) includes two sides, the identification mark (116) is located on both sides of the package (104). In an example, the identification mark (116) is a logo, a color, a shape, a texture, at least one character, an image, or combinations thereof that are printed onto each side of the package (104). In some examples, a digital printing process, such as VDP, is used to print the identification mark (116) on each side of the package (104). This can occur at time of labeling of the package (104). VDP is desirable because text, graphics, images, identification marks and information marks can be changed from package to package if needed at time of printing.

In some examples, the identification mark (116) is the minimum needed to identify the contents (102) associated with the package (104). However, the system (100) also uses the capability to reliably differentiate contents of packages with the same identification mark based on dimensions of the packages. For example, the identification mark (116) is used to identify a category associated with contents (102) of the package (104). The category is for example, medication manufactured by company X. Since company X manufactures several types of medications and different doses of the medications, to differentiate the contents (i.e. the type of medication and dose) associated with the packages in that category, the dimensions of the package (104) are determined by the POS system (108). In this example, the dimensions of the packages for this category are unique such that the contents (102) of the package (104) can be identified via a combination of the identification mark (116) and the dimensions of the package (104). More information about identification mark (116) will be described in FIGS. 3A and 3B.

The system (100) includes a database (110). As will be described in FIG. 2, the database (110) stores information relating to contents associated with packages, text, graphics, images, identification marks, and information marks on the package to create a SKU. For example, the database (110) stores, in memory, information about a number of identification marks associated with contents of a number of packages. More information about the database (110) will be described below.

The system (100) further includes the POS system (108). In keeping with the given example, the POS system (108) uses a camera (224) to image the package (104), where an identical identification mark (116) is located on all sides of the package (104) such that when an image of the package (104) is captured, an image of the identification mark (116) appears in the image irrespective of an orientation of the package (104) to the camera (224). As a result, the image of the package (104) can be captured from any angle since the identification mark (116) is located on the package (104) such that the identification mark (116) is guaranteed to appear in the image. The use of the identification mark (116) on every side of the package (104) means that security printing authentication from any direction can be garnered.

Further, the POS system (108) identifies with the database (110), the contents (102) associated with the package (104) based on the identification mark (116) from the image. In some examples, the POS system (108) is in communication with the database (110) via a network (106). This allows the POS system (108) to access information in the database (110). In an example, the POS system (108) matches the information derived from analyzing the image of the package (104), such as the identification mark (116), with information stored in the database (110) to identify the contents (102) associated with the package (104). As will be described below, if the system (100) includes two packages with the identification mark (116) located on all sides of each of the packages, the POS system (108) can further analyze the image to determine the dimensions of the package in the image to determine the contents (102) of the package (104) since the dimensions of the packages are unique as described above. Such a system (100) uses object recognition technology in combination with a specific approach to VDP to provide a robust way of identifying the contents (102) associated with the package (104).

While this example has been described with reference to the POS system being located over the network, the POS system could be located in any appropriate location according to the principles described herein. For example, the POS system could be located in a user device, a network server, a database, a POS system, other locations, or combinations thereof.

Figure 2:
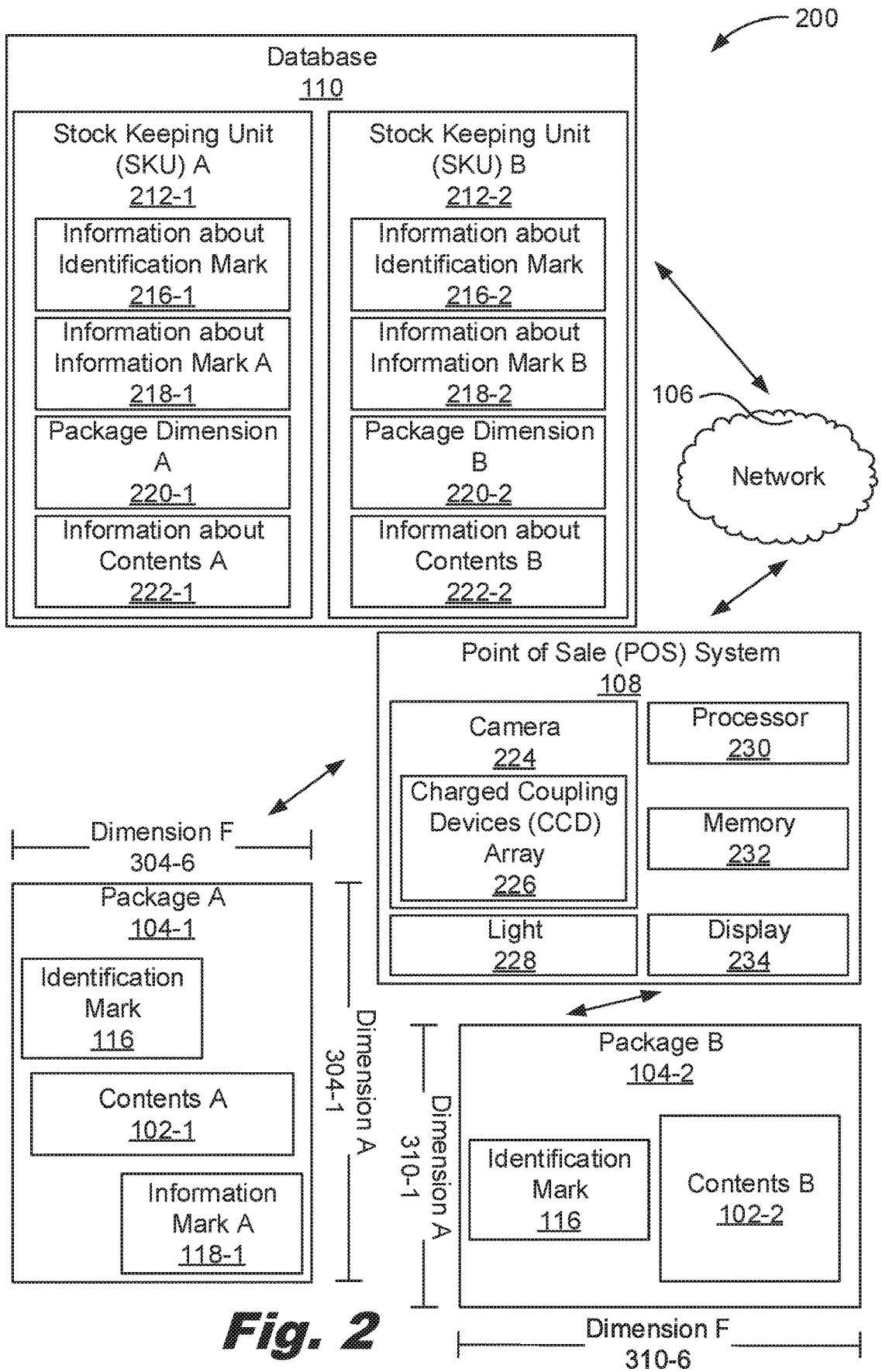
FIG. 2 is a diagram of a system for imaging a package to identify contents associated with the package, according to one example of principles described herein.

FIG. 2 is a diagram of a system for identifying contents of a package, according to one example of principles described herein. As will be described below, the system (200) includes a database (110) to store information relating to a number of identification marks (216) in the database (110), the information for each of the identification marks (216) aids a POS system (108) in identifying the contents (102) of a number of the packages (104). Further, the POS system (108) includes a camera (224) to image a package (104), where an identical identification mark (116) is located on all sides of the package (104) such that when an image of the package (104) is captured, an image of the identification mark (116) appears in the image irrespective of an orientation of the package (104) to the camera (224). The POS system (108) determines if the image is valid or invalid. Further, the POS system (108) determines if the image includes a barcode. The POS system (108) includes a processor (230) and memory (232) to analyze the image to identify the identification mark (116) on the package (104) from the image. Further, the POS (108) with the database (110), identifies the contents (102) associated with the package (104) based on the identification mark (116) from the image.

As illustrated, the system (200) includes the database (110). The database (110) stores, in memory, a number of SKUs (212). A SKU is a unique identifier for each distinct product, such as contents (102) of a package (104), that can be purchased by a customer at a retail store. In some examples, the SKUs (212) are created as an extensible markup language (XML) file and are associated with the contents (102) of the packages (104). In some examples, as attributes associated with the contents (102) of the packages (104) are modified by, for example, the manufacture and/or retailer, the SKUs (212) can be updated accordingly in the database (110). In some examples, the XML files are managed in the same secure processing environment as the POS system (108) approval.

In an example, the database (110) stores, in memory SKU A (212-1) and SKU B (212-2). As will be described below, information in the database (110) for SKU A (212-1) corresponds to package A (104-1), contents A (102-1), information mark A (118-1), and the identification mark (116) on package A (104-1). Information in the database (110) for SKU B (212-2) corresponds to package B (104-2), contents B (102-2), and the identification mark (116) on package B (104-2).

A SKU (212) is created by registering specific information, such as, information about the identification mark (116) on each of the packages (104). For SKU A (212-1), the information about the identification mark (216-1), as illustrated in the database (110), corresponds to the identification mark (116) located on package A (104-1). In this example, the information includes the fact that the identification mark (116) is located in the corners of package A (104-1), is a logo for company X, and has an average red green blue (RGB)

value of 32. Further, other information about the identification mark (116) could be stored in the database (110) for package A (104-1) such that the identification mark (116) on package A (116) could further be matched to the information in the database (110).

For SKU B (212-2), the information about identification mark (216-2), as illustrated in the database (110), corresponds to identification mark (116) located on package B (104-2). In this example, the information includes that the identification mark (116) is located in the edges of package B (104-2), is a logo for company X, and has an average RGB value of 32. In this example, the identification mark (116) located on package A (104-1) is the same identification mark (116) located on package B (104-2). As a result, the information (216-1) stored in the database (110) for the identification mark (116) for package A (104-1) is almost the same as the information (216-2) stored in the database (110) for identification mark (116) for package B (104-2). Further, other information about the identification mark (116) could be stored in the database (110) for package B (104-2) such that the identification mark (116) on package B (116) could further be matched to the information in the database (110).

The SKUs (212) are created by registering specific information, such as, information about information marks (218). For SKU A (212-1), the information about information mark A (218-1), as illustrated in the database (110), corresponds to information mark A (118-1) located on package A (104-1). The information (218-1) stored in the database (110) about information mark A (118-1) includes that it is located in the corner of side C (302-3) of package A (104-1) and that it is linked to promotional information such as signing up for a credit card.

For SKU B (212-2), the information about information mark B (218-2), as illustrated in the database (110), corresponds to information mark B (118-2) located on package B (104-2). The information (218-2) stored in the database (110) about the information mark B (118-2) includes that it is located on the top portion of side ID (308-4) of package B (104-2) and that it is linked to promotional information such as redeeming reward points.

The SKUs (212) are created by registering specific information, such as, package dimensions (220). This includes the height and width of each side of the packages (104). This can include ratios such as length to width of each side of the packages (104), ratio between the dimensions of the identification mark (116) and the dimensions of the sides of the packages (104). This can include exact measurements such as side A of package A (104-1) is 6 inches high and 4 inches wide.

For SKU A (212-1), package dimension A (220-1) includes that the sides of package A (104-1) are defined by dimension F (304-6) and dimension A (304-1). In this example, dimension F (304-6) is less than dimension A (304-1).

Figure 3A:
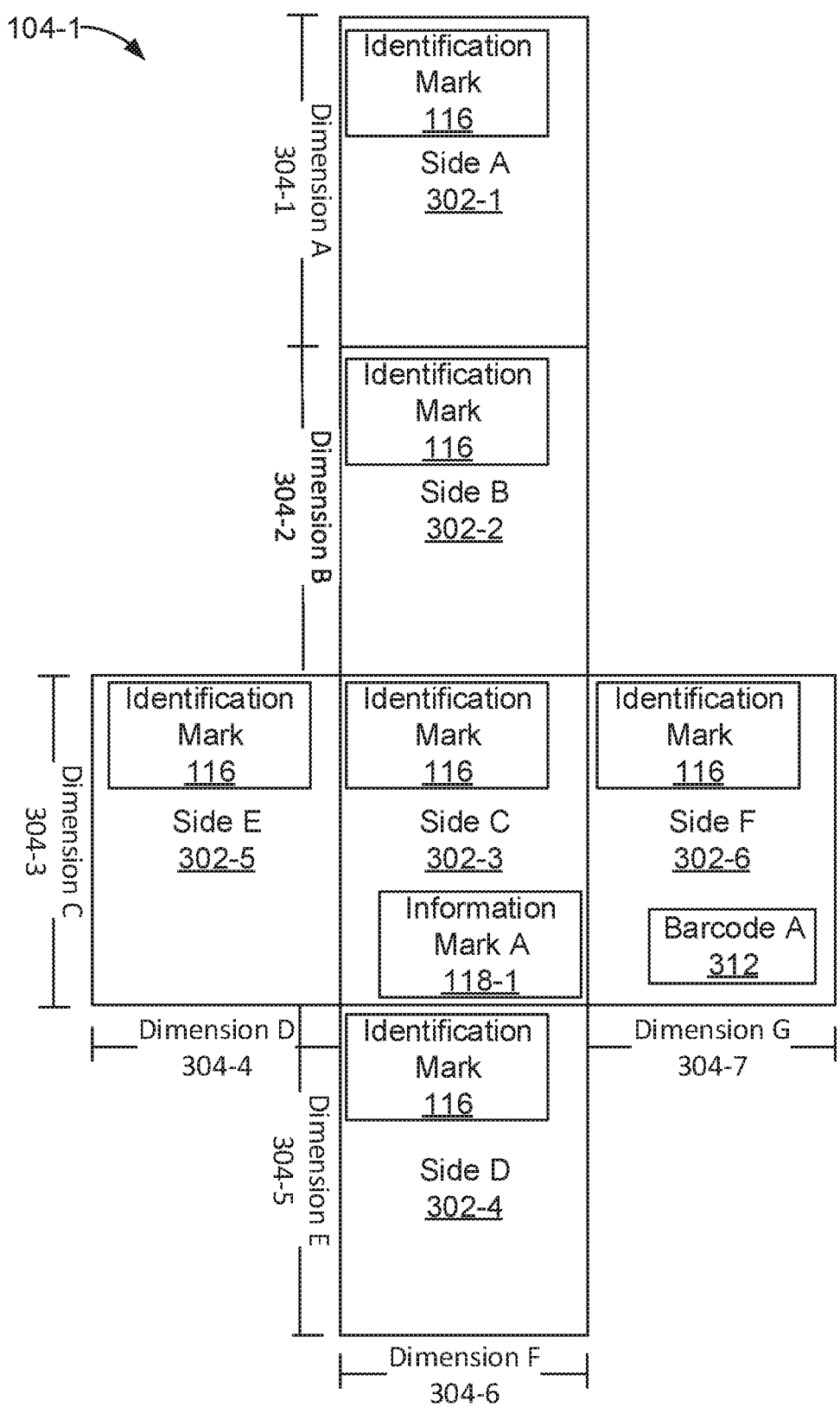
FIG. 3A is a diagram of a package, according to one example of principles described herein.
Figure 3B:
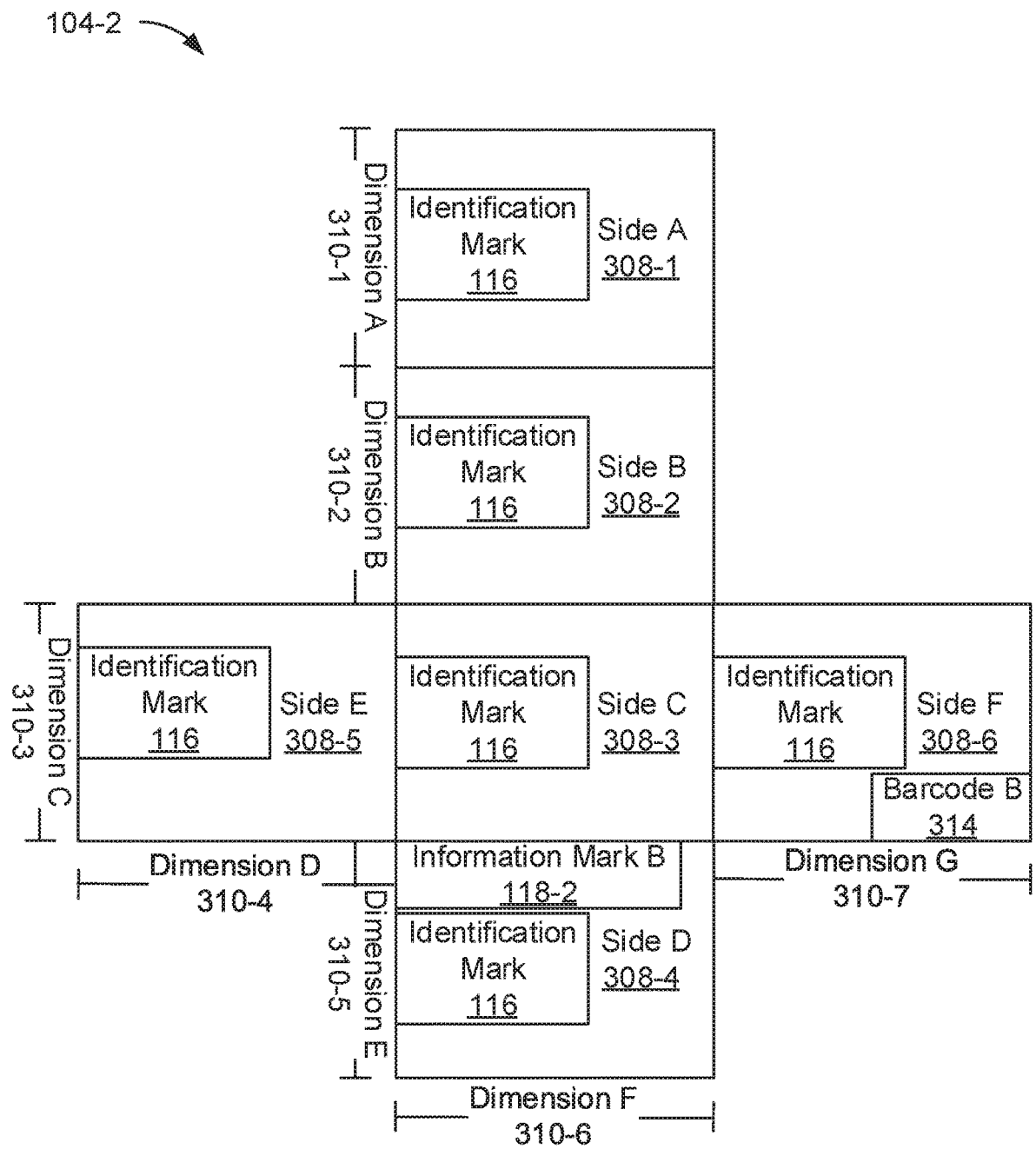
FIG. 3B is a diagram of a package, according to one example of principles described herein.

For SKU B (212-2), package dimension B (220-1) includes that the sides of package B (104-2) are defined by dimension F (310-6) and dimension A (310-1) as illustrated in FIG. 3B. In this example, dimension F (310-6) is greater than dimension A (310-1).

The SKUs (212) are created by registering specific information, such as information about contents (222). For SKU A (212-1), information about contents A (222-1) includes that contents A (102-1) is a pain relieving medicine. Specifically, 50 milligrams (mg) of a pain relieving medicine manufactured by company X.

For SKU B (212-2), information about contents B (222-2) includes that contents B (102-2) is a pain relieving medicine. Specifically, 100 mg of a pain relieving medicine manufactured by company X.

The SKUs (212) can further include information such as a location for identification marks (116) and/or information marks (118), number of sides for the packages (104), which sides of the packages (104) includes the information marks (118), location of sides in relative x and y coordinates of the identification mark (116), the information mark (118), a location of a barcode, and the location of any other VDP security printing marks. As a result, the contents (102) of the packages (104) are registered by logging all of this information in the database for each SKU (212).

As will be described below, when an image of package A (104-1) is captured and analyzed, information determined from the image can be compared with this information in the database (110) such that the POS system (108) can determine that the image is of package A (104-1), and therefore know that contents A (102-1) is associated with package A (104-1).

As will be described below, when an image of package B (104-2) is captured and analyzed, information determined from the image can be compared with this information in the database (110) such that the POS system (108) can determine that the image is of package B (104-2), and therefore know that contents B (102-2) is associated with package B (104-2).

As illustrated the system (200) includes a number of packages (104). For example, the system (200) includes package A (104-1) and package B (104-2). As will be described in FIGS. 3A and 3B, each of the packages (104) are defined by dimensions (304 and 310) such as a length, width, and depth corresponding to sides of the packages (104). Package A (104-1) is defined by dimension F (304-6) and dimension A (304-1). Package B (104-2) is defined by dimension F (310-6) and dimension A (310-1).

Each of the packages (104) includes contents (102). For example, package A (104-1) includes contents A (102-1) and package B (104-2) includes contents B (102-2). The contents (102) are a customer good that is associated with the packages (104). The contents (102) can be enclosed and/or protected by the packages (104). In this example, contents A (102-1) is 50 mg of a pain-relieving medicine manufactured by company X. Contents B (102-2) is 100 mg of a pain relieving medicine manufactured by company X.

Each of the packages (104) includes an identification mark (116). An identification mark (116) is a mechanism located on each side of the packages (104) to aid a POS system (108) in identifying contents (102) associated with the packages (104). In an example, the identification mark (116) is a logo. For example, identification mark (116) is a logo associated with company X. The logo is defined by a number of shapes and/or a number of colors. As will be described below, the identification mark (116) is used to determine a category of the contents (102) for the packages (104). The dimensions (304 and 310) of the packages (104) in combination with the identification mark (116) are used determine the contents (102) for the packages (104).

While this example has been described with reference to the identification mark (116) being a logo, the identification mark (116) could be a color, a shape, a texture, at least one character, an image, or combinations thereof that are printed onto each side of the package. More information about identification mark (116) will be described in FIGS. 3A and 3B.

Each of the packages (104) includes an Information mark (118). In an example, the information mark (118) is a mechanism located on at least one side of the packages (104) to aid the POS system (108) in identifying additional information associated with contents (102) of the packages (104), a retailer, or a user's account. The additional information includes, for example, how to redeem reward points associated with the retailer, how to sign up for a credit card associated with the retailer, other additional information, or combinations thereof. While the information mark (118) is not used to identify the contents (102) of the packages (104), the information mark (118) allows the POS system (108) to enter into a number of different workflows. For example, if the information mark (118) is associated with coupons, once an image of the information mark (118) is captured, the POS system (108) enters into a workflow for coupons. This workflow for coupons includes reducing the price of contents (102) at time of purchase. Other workflows are associated with gaming, loyalty or other customer-interaction depending on the intended purpose of the information mark (118). In some examples, the information mark (118) is located next to identification mark (116). In another example, the information mark (118) is located on at least one side, but could be located on each side of the packages (104).

While the above example describes how information marks can be used as a benefit for a consumer, the information marks can be used to benefit the retailer and/or brand owner. For example, the information marks could provide the retailer and/or brand owner with additional tracking information for a region, store, or location of the package on a self of the store. This allows the brand owner in conjunction with the brand manager to assign specific information to each of the different print service providers that print the information mark on the packages such that the mix of the information marks are given to a specific retailers in a country, region or town. This information is recorded in the database and tracked at the POS systems for these retailers. For example, a retailer could specify the mix of information marks for a specific product for a particular store (i.e. information marks vary for the product). If the retailer wants to experiment with multiple shelf positions or floor locations of a specific product within the retail store, additional information gleaned from the POS system (108) form the mix of information marks can be exploited by the brand owner and/or retailer to determine the optimal store location for a product. In an example, one could specify a type of modulation scheme to vary the information mark (118) and/or identification mark (116) over time to aid in anti-counterfeiting or establish a quick check on expiration dates for the contents of the package.

As illustrated the system (200) includes the POS system (108). The POS system (108) is a device that aids a retailer in identifying products sold to a customer at time of purchase. The POS system (108) uses customized hardware and software components tailored to suit the particular needs of the retailer. In some examples, the POS system (108) is a mobile device. As a result, the POS system (108) can be transported from one location to another location. In another example, the POS system (108) is a stationary device. As a result, the POS system (108) cannot be transported from one location to another location.

The POS system (108) includes a camera (224). The camera (224) is such that it is able to capture the images of the packages (104). For example, conventional complementary metal-oxide-semiconductor (CMOS) cameras introduce distortion with moving object especially close to the lens as the angular rate of movement is high. In some instances CMOS camera can be used by the POS (108) system. However, when using such a CMOS camera, the POS system (108) uses a global shutter and strobed camera set up. In another example, a sensitive CCD array (226) will generally suffice for capturing an image of the packages (104). Further, other sensors, such as structured lighting, can be used to aid the POS system (108) in determining dimensions and shapes of the packages (104) and/or on the packages (104).

In some example, the camera (224) is calibrated if absolute color is used to distinguish one identification mark from another identification mark. As a result, the image includes specific RGB values. This can be useful when an identification mark is defined by a color.

The POS system (108) needs decent lighting to provide consistent illumination of the package while the camera (224) captures the image. As a result, the POS system (108) includes a light (228). The light (228) is such that the packages (104) are illuminated sufficiently to capture an image of the package (104) without distortion of the image.

In one example, the camera (224) and/or the light (228) are mounted on a pivoting mechanism of the POS system (108). This allows the light (228) and camera (224) to swivel as needed to capture images of the packages (104).

In an example, the image is to capture a combination of the identification mark (116) and at least one side of the package (104) such that the dimensions of the package (104) can be determined. As a result, if the POS system (108) does not capture an image with both the identification mark (116) and at least one side of the package (104) such that the dimensions of the package (104) can be determined, the image is invalid.

The POS system (108) includes a processor (230) and memory (232). The processor (230) and memory (232) are used to analyze an image as described below. To recognize the identification mark (116) of the package (104), image segmentation and recognition methods are used on the image. For example, the identification mark (116) is detected by a XY Cut segmentation method. In the XY Cut segmentation method, the image is divided into a number of regions. Each region of the image is then recognized with key points detection and matching to identify the identification mark (116) on the packages (104). The key points include boarders, boundaries or lines that define the identification mark (116). Other methods could be used to recognize the identification mark (116). These methods include using pixel analysis, color analysis, shape analysis, a texture analysis, other methods or combinations thereof. These other methods are based on the type of identification mark. For example, if an identification mark is a color, a color analysis is used to analyze the image. This includes determining RGB values of the image. If an identification mark is a shape, a shape analysis is used to analyze the image. This includes determining what shapes are present in the image.

The POS system (108) includes a display (234). The display (234) is used to display messages to a user. Examples of messages will be described in FIGS. 4A, 4B, and 40.

The POS system (08) stores a number of identification marks (216) in the database (110), each of the number of identification marks (216) corresponding to contents (102) of a number of the packages (104). The database (110) further stores a number of sides associated with each of the packages (104), a location of the identification mark (116) on each of the sides of the packages (104), a location of information marks (118) on at least one of the sides of the packages (104), a location of barcodes on at least one of the sides of the packages (104), or combinations thereof.

The POS system (108) uses the camera (224) to image the packages (104), where an identical identification mark (116) is located on all sides of the packages (104) such that when an image of the package (104) is captured, an image of the identification mark (116) appears in the image irrespective of an orientation of the package (104) to the camera (224).

Further, the POS system (108) determines if the image is valid or invalid. The image is valid when the processor (230) and the memory (232) of the POS system (108) identifies the identification mark (116) on the packages (104) from the image and determines dimensions of the package (104) from the image. The image is invalid when the processor (230) and the memory (232) of the POS system (108) does not identify identification mark (116) on the packages (104) from the image or does not determine the dimensions of the packages (104) from the image.

The POS system (108) further determines if the image includes a barcode. In some examples, if the image includes a barcode, the POS system (108) analyzes the image to read the barcode. As a result, the barcode is used by the POS system (108) to identify the contents (102) of the packages (104) instead of using identification marks (116) and dimensions of the packages (104) to identify the contents (102) of the packages (104).

Further, the POS system (108) with the processor (230) and the memory (232), analyzes the image to identify identification mark (116) on the packages (104) from the image. The POS system (110) identifies the information mark A (116) in the image by segmenting the image into a number of regions. The POS system (108) identifies the identification mark (116) in the image by identifying key points of the identification mark (116) within the regions. The POS system (108) identifies the identification mark (116) in the image by matching the key points of the identification mark in the image to predetermined key points to identify the identification mark.

The POS system (108) further with the database (110), identifies the contents (102) associated with the packages (104) based on the identification mark (116) and dimension of the package (104) from the image.

An overall example of FIG. 2 will now be described with respect to package A (104-1). The POS system (108) stores a number of identification marks in the database, with each of the number of identification marks corresponding to contents of a number of the packages. The camera (224) of the POS system (108) images package A (104-1). The POS system (108) determines if the image is valid or invalid. In this example, the image includes identification mark (116) and a side of package A (104-1). As a result, the image is valid. The POS system (108) determines if the image includes a barcode. In this example, the image does not include a barcode. With a processor and memory of the POS system (108), the image is analyzed to identify the identification mark (116) on package A (104-1) from the image. The image is analyzed to determine the dimensions of package A (104-1) from the image. In this example, the dimensions of package A (104-1) from the image are dimension F (304-6) and dimension A (304-1). The POS system (108) with a database, identifies the content A (102-1) is associated with package A (104-1) based on the identification mark (116) from the image and the dimensions (304) of package A (104-1) determined from the image. A message associated with the contents of the package is displayed. In this example, the message is the price of contents A (102-1).

An overall example of FIG. 2 will now be described with respect to package B (104-2). The POS system (108) stores a number of identification marks in the database, each of the number of identification marks corresponding to contents of a number of the packages. The camera (224) of the POS system (108) images package B (104-2). The POS system (108) determines if the image is valid or invalid. In this example, the image includes identification mark (116) and a side of package B (104-2). As a result, the image is valid. The POS system (108) determines if the image includes a barcode. In this example, the image does not include a barcode. With a processor and memory of the POS system (108), the image is analyzed to identify the identification mark (116) on package B (104-2) from the image. The image is analyzed to determine the dimension of package B (104-2) from the image. In this example, the dimensions of package B (104-2) from the image are dimension F (310-6) and dimension A (310-1). The POS system (108) with a database, identifying the contents B (102-2) is associated with package B (104-2) based on identification mark (116) from the image and the dimensions (310) of package B (104-2) determined from the image. A message associated with the contents of the package is displayed. In this example, the message is the price of contents B (102-2).

While this example has been described with both package A and package B including identical identification marks, package A and package B could include distinct identification marks. For example, package A could include identification mark X and package B could include identification mark Y, where identification mark X is not identical to identification mark Y. As a result, the images of the packages are analyzed to identify the identification mark only since the identification marks are unique among the packages.

FIG. 3A is a diagram of a package, according to one example of principles described herein. As will be described below, package A (104-1) includes a number of sides (302). Each of the sides (302) is defined by dimensions (304). Each of the sides (302) includes an identification mark (116).

In this example, the diagram illustrates package A (104-1). Specifically, the diagram illustrates an exploded view of package A (104-1) such that all sides (302) of package A (104-1) are shown in the diagram. In this example, package A (104-1) is a cuboid.

As illustrated, package A (104-1) includes a number of sides (302). For example, package A (104-1) includes side A (302-1), side B (302-2), side C (302-3), side D (302-4), side E (302-5), and side F (302-6).

Each of the sides (302) is defined by dimensions (304). For example, side A (302-1) is defined by dimension A (304-1) and dimension F (304-6). Side B (302-2) is defined by dimension B (304-2) and dimension F (304-6). Side C (302-3) is defined by dimension C (304-3) and dimension F (304-6). Side D (302-4) is defined by dimension E (304-5) and dimension F (304-6). Side E (302-5) is defined by dimension C (304-3) and dimension D (304-4). Side F (302-6) is defined by dimension C (304-3) and dimension G (304-7).

As illustrated, dimension A (304-1), dimension B (304-2), dimension C (304-3) and dimension E (304-5) are all of equal measurement. Dimension D (304-4), dimension F (304-6) and dimension G (304-7) are all of equal measurement. Further, dimension A (304-1), dimension B (304-2), dimension C (304-3) and dimension E (304-5) are all of greater measurement than dimension D (304-4), dimension F (304-6) and dimension G (304-7). Again, these dimensions (304) associated with package A (104-1) are stored in the database (110) such that the POS system (108) with the database (110) identifies the contents of a package (104) based on, in part, these dimensions (304).

Each of the sides (302) includes an identical identification mark (116). For example, side A (302-1) includes the identification mark (116). Side B (302-2) includes the identification mark (116). Side C (302-3) includes the identification mark (116). Side D (302-4) includes the identification mark (116). Side E (302-5) includes the identification mark (116). Side F (302-6) includes the identification mark (116). The identification mark (116) can be printed, as preferred by branding or marketing on one or more of the sides of package A (104-1).

Given the nature of VDP, the identification mark (116) could even be item-level unique, in which case it is termed a unique identification (ID). Such an identification mark could be printed on two or more sides of a package, depending on how many sides the package includes. In some examples, the identification mark (116) needs to only identify the category of product and the image processing is used to determine the specific dimensions of the package A (104-1) and thus the SKU of the contents of package A (104-1) within the category.

Again, the information for identification mark (116) associated with package A (104-1) is stored in the database (110) such that the POS system (108) with the database (110) can identify the contents of a package (104) based on, in part, the identification mark (116).

Side C (302-3) includes information mark A (118-1). Information mark A (118-1) is defined by a color, a shape, a texture, at least one character, an image, or combinations thereof. Again, information mark A (118-1) associated with package A (104-1) is stored in the database (110) such that the POS system (108) with the database (110) identifies the additional information associated with package A (118-1) based on, in part, information mark A (118-1).

The identification mark (116) and information mark A (118-1) are printed on the package via VDP. VDP is a way of providing security printing inasmuch as each variable copy hole can have unique information written to it. Up to hundreds or thousands of bits depending on style, type and color palette can be written to the copy hole. Thus, there are an effectively infinite number of security printing VDP marks possible, ensuring that a unique ID can be garnered for the packages. In some examples, the copy hole is the location on the package where the identification mark (116) and information mark A (118-1) are located. A small set of VDP copy holes is used in packaging. Most packaging is static to reduce costs, simplify the design and improve processing on the printing press. The identification mark (116) is printed on each side of a package to allow it to identify a smaller category of objects, and then use image analysis to discern size, shape and volume of the package and so classify the product within the usually modest set of SKUs associated with identification mark (116).

Side F (302-6) includes barcode A (312). Again, barcode A (312) can still be used if the POS system (108) captured an image of barcode A (312).

FIG. 3B is a diagram of a package, according to one example of principles described herein. As will be described below, package B (104-2) includes a number of sides (308). Each of the sides (308) is defined by dimensions (310). Each of the sides (308) includes an identification mark (116).

As will be described below, package B (104-2) includes a number of sides. Each of the sides is defined by dimensions (310). Each of the sides includes an identification mark (116).

In this example, the diagram illustrates package B (104-2). Specifically, the diagram illustrates an exploded view of package B (104-2) such that all sides (308) of package B (104-2) are shown in the diagram.

As illustrated, package B (104-2) includes a number of sides (302). For example, package B (104-2) includes side A (308-1), side B (308-2), side C (308-3), side D (308-4), side E (308-5), and side F (308-6).

Each of the sides (308) is defined by two dimensions (310). For example, side A (308-1) is defined by dimension A (310-1) and dimension F (310-6). Side B (308-2) is defined by dimension B (310-2) and dimension F (310-6). Side C (308-3) is defined by dimension C (310-3) and dimension F (310-6). Side D (308-4) is defined by dimension E (310-5) and dimension F (310-6). Side E (308-5) is defined by dimension C (310-3) and dimension D (310-4). Side F (308-6) is defined by dimension C (310-3) and dimension G (310-7).

As illustrated, dimension A (310-1), dimension B (310-2), dimension C (310-3) and dimension E (310-5) are all of equal measurement. Dimension D (310-4), dimension F (310-6) and dimension G (310-7) are all of equal measurement. Further, dimension A (310-1), dimension B (310-2), dimension C (310-3) and dimension E (310-5) are all of lesser measurement than dimension D (310-4), dimension F (310-6) and dimension G (310-7). Again, these dimensions (310) associated with package B (104-2) are stored in the database (110) such that the POS system (108) with the database (110) identify the contents of a package (104) based on, in part, these dimensions (310).

Each of the sides (308) includes an identical identification mark (116). For example, side A (308-1) includes the identification mark (116). Side B (308-2) includes the identification mark (116). Side C (308-3) includes the identification mark (116). Side D (308-4) includes the identification mark (116). Side E (308-5) includes the identification mark (116). Side F (308-6) includes the identification mark (116). The identification mark (116) can be printed, as preferred by branding and/or marketing on one or more of the sides of the package.

Again, the identification mark (116) associated with package B (104-2) is stored in the database (110) such that the POS system (108) with the database (110) can identify the contents of package B (104-2) based on, in part, the identification mark (116).

Side D (308-4) includes information mark B (118-2). Information mark B (118-2) is defined by a color, a shape, a texture, at least one character, an image, or combinations thereof. Again, information mark B (118-2) associated with package B (104-2) is stored in the database (110) such that the POS system (108) with the database (110) identify the additional information associated with package B (118-2) based on, in part, information mark B (118-2).

Side F (308-6) includes barcode B (314). Barcode B (314) can be used if the POS system (108) captured an image of barcode B (314).

Figure 4A:
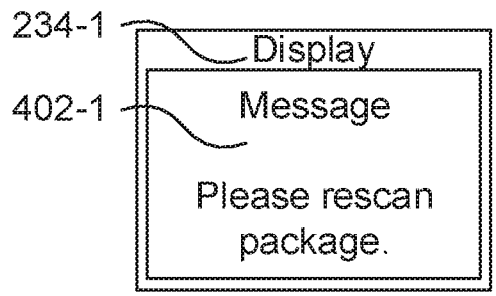
FIG. 4A is an example of a message, according to one example of principles described herein.

FIG. 4A is an example of a message, according to one example of principles described herein. As mentioned above, the display (234) of the POS system (108) is used to display a message (402) associated with the contents (102) of the package (104). In this example, the message (401-1) is displayed before the POS system (108) can identify the contents (102) of the package (104).

In this example, the display (234-1) displays a message (402-1) indicating, "Please rescan package." A message such as this message (402-1) is displayed via the display (234-1) when the image is invalid as described above.

Figure 4B:
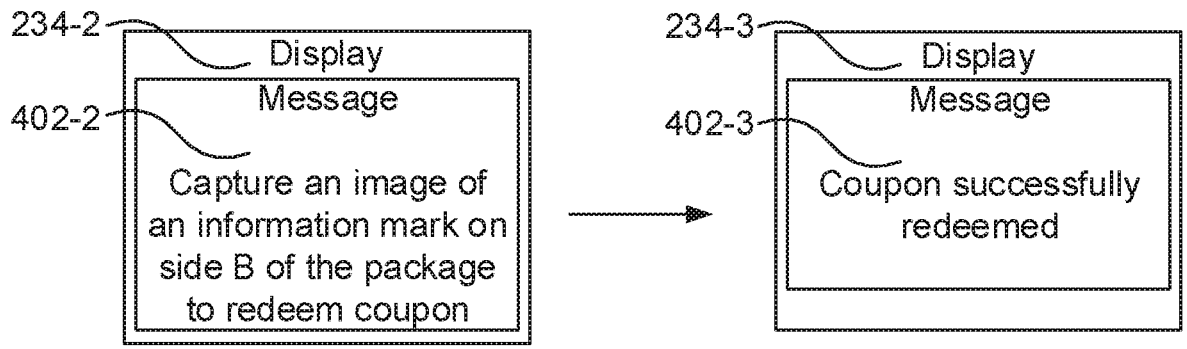
FIG. 4B is an example of a message, according to one example of principles described herein.

FIG. 4B is an example of a message, according to one example of principles described herein. As mentioned above, the display (234) of the POS system (108) is used to display a message (402) associated with the contents (102) of the package (104). In this example, the message (401-2 and 401-3) is displayed after the POS system (108) can identify the contents (102) of the package (104).

In this example, the display (234-2) displays a message (402-2) indicating, "Capture an image of an information mark on side B of the package to redeem coupon." In this example, if the user desires to redeem the coupon, the consumer captures a subsequent image of side B of the package via the camera (224) of the POS system (108). Once, the subsequent image of the information mark has been captured, the display (234-3) displays a subsequent message (402-3) indicating, "Coupon successfully redeemed."

Figure 4C:
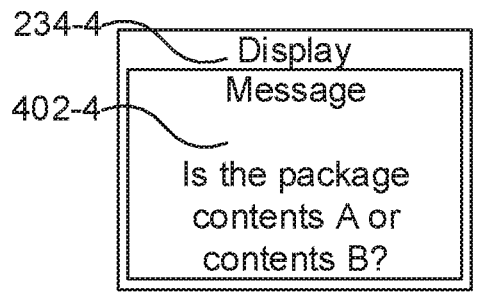
FIG. 4O is an example of a message, according to one example of principles described herein.

FIG. 4C is an example of a message, according to one example of principles described herein. As mentioned above, the display (234) of the POS system (108) is used to display a message (402) associated with the contents (102) of the package (104). In this example, the message (402-4) is displayed while the POS system (108) identifies the contents (102) of the package (104).

In an example, if a package includes identical identification marks as well as dimensions of another package, the display (234-4) displays a message prompting the user to manually identify the contents (102) of the package (104). In this example, the message (402-4) indicates, "Is the package contents A or contents B?" The user can then select which contents (102) correspond to the package (104) via a touch screen of the POS system (108).

Figure 5:
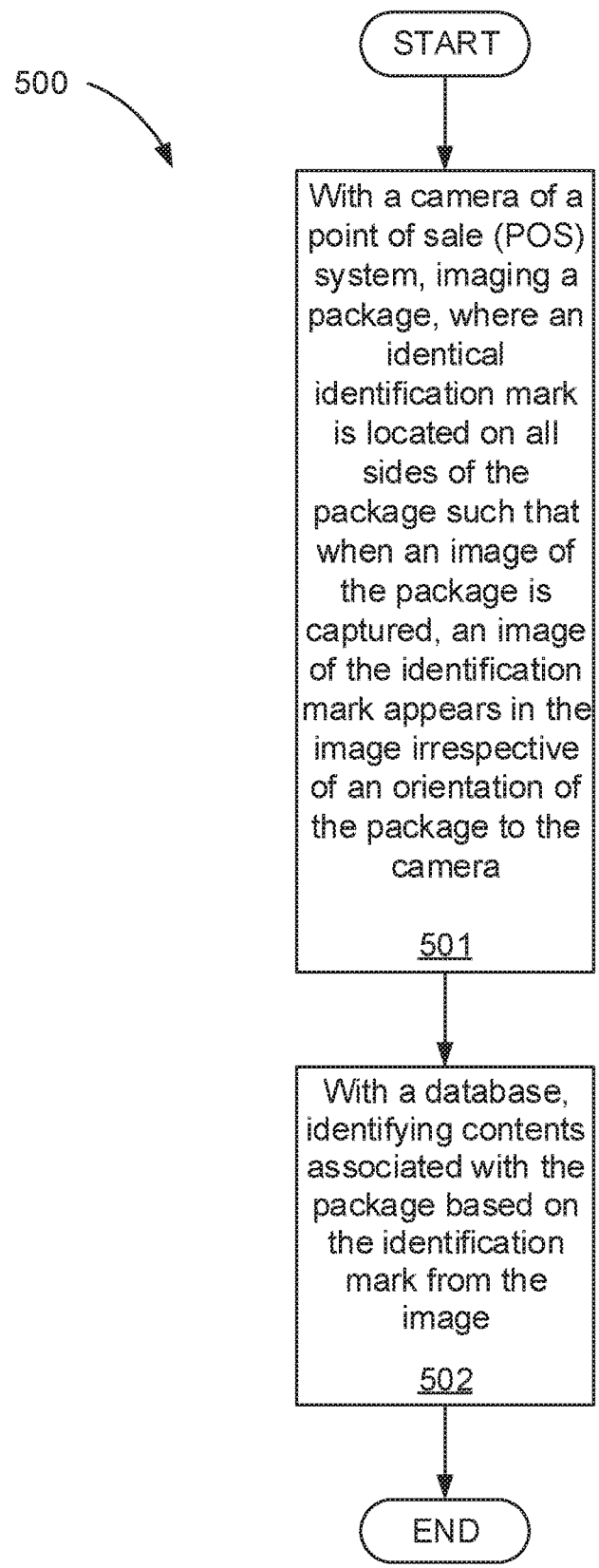
FIG. 5 is a flowchart of a method for imaging a package to identify contents associated with the package, according to one example of principles described herein.

FIG. 5 is a flowchart of a method for imaging a package to identify contents associated with the package, according to one example of principles described herein. The method (500) is executed by the system (100) of FIG. 1. The method (500) is executed by other systems such as system 200, system 700 or system 800. The method (500) includes with a camera of a POS system, imaging (501) a package, where an identical identification mark is located on all sides of the package such that when an image of the package is captured, an image of the identification mark appears in the image irrespective of an orientation of the package to the camera and with a database, identifying (502) contents associated with the package based on the identification mark from the image.

As mentioned above, the method (500) includes with a camera of a POS system, imaging (501) the package, where an identical identification mark is located on all sides of the package such that when an image of the package is captured, an image of the identification mark appears in the image irrespective of an orientation of the package to the camera.

VDP is used to ensure that every side of the package contains at least one identification mark. On a typical box-like package, which is a rectangular cuboid, there are six sides and thus six identical identification marks. If the camera is placed directly perpendicular, to one side of the package, such that the direction from the camera lens is normal to the surface of the package, then the image includes one side of the package. This is the worst case situation for the method (500), assuming that the line of sight between the camera and the cuboid is not obstructed. Thus, one identification mark per side of the package is a guarantee of visibility of at least one identification mark, barring the attachment of adhesive labels, coupons, over the identification mark.

In some examples, the image includes one identification mark. In other examples, the image includes several identification marks. When the image includes several of the identification marks, the method (500) only needs to analyze one of the identification marks.

In some examples, a metameric difference in the information mark and/or the identification mark is provided such that the POS system could detect this difference. This could be used to provide the retailer with information on package wear. As a result, if an information mark and/or identification mark is worn on a particular location of the package then the retailer can specify a new location for the information mark and/or the identification mark. This adjustment can be made at time of printing.

As mentioned above, the method (500) includes with a database, identifying (502) the contents associated with the package based on the identification mark from the image. In some examples, only the identification mark is needed to identify the contents of the package. However, if the identification mark is associated with two or more packages, the method (500) uses the determined dimensions of the package from the image to further identify the contents of the package as described above. Such a method (500) improves automation at the checkout line in a retail store because VDP is used on the packaging of contents to improve accuracy, speed and customer experience.

The method (500) effectively marries VDP, packaging and image analytics at the POS, front ends stocking, inventory management and inventory reconciliation. For example, once the contents of the package are sold to the customer or returned to the retailer after being purchased, the POS system can update the inventory of the retailer accordingly.

While this example, has been described with reference to the information mark and the identification mark located on a cuboid package, the information mark and the identification mark located on a non-cuboid package. Non-cuboid packages include, for example bags and envelopes.

Figure 6:
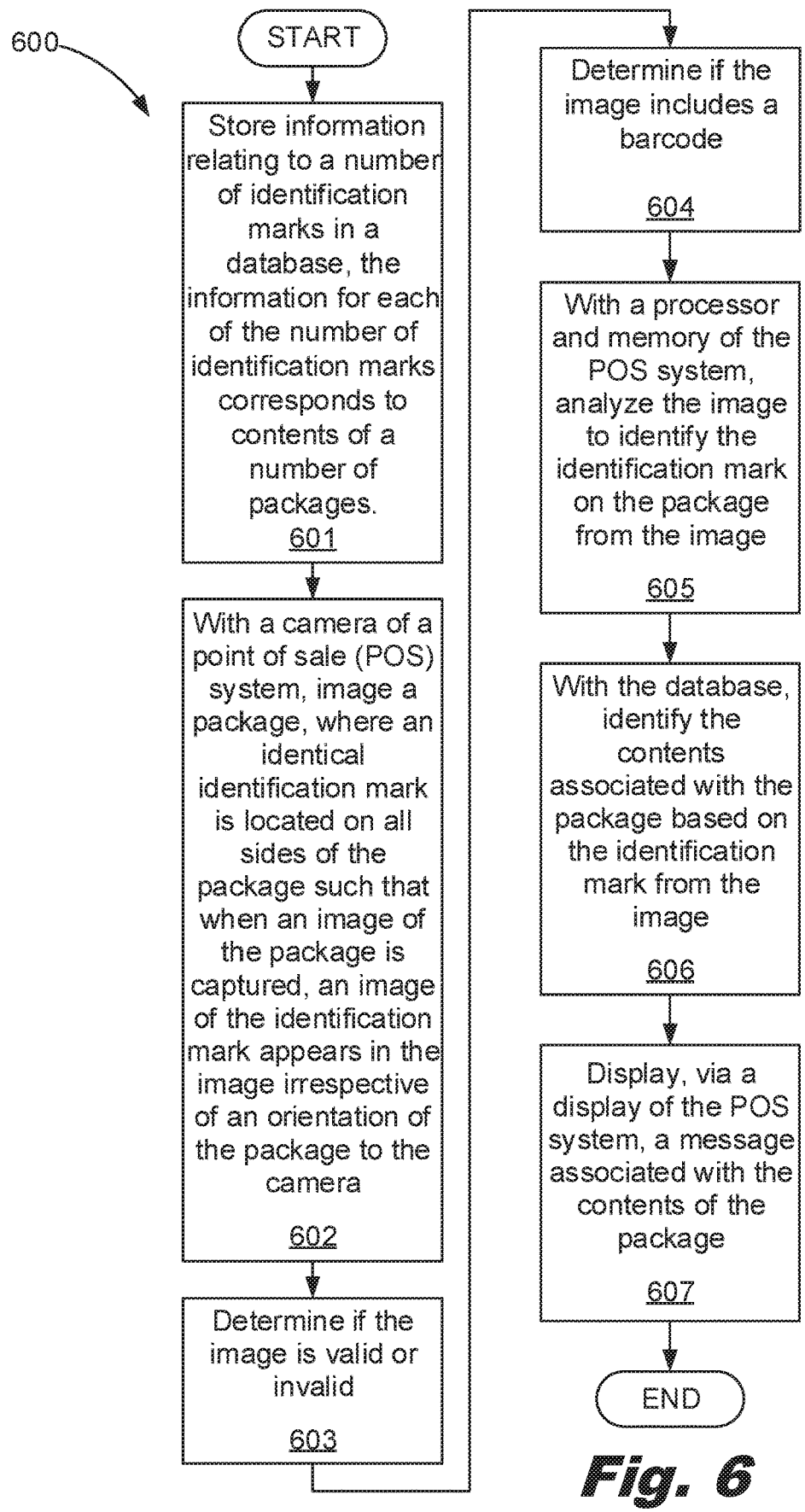
FIG. 6 is a flowchart of a method for imaging a package to identify contents associated with the package, according to one example of principles described herein.

FIG. 6 is a flowchart of a method for imaging a package to identify contents associated with the package, according to one example of principles described herein. The method (600) is executed by the system (100) of FIG. 1. The method (600) is executed by other systems such as system 200, system 700 or system 800. The method (600) includes storing (601) information relating to a number of identification marks in a database, the information for each of the number of identification marks corresponds to contents of a number of packages, with a camera of a POS system, imaging (602) a package, where an identical identification mark is located on all sides of the package such that when an image of the package is captured, an image of the identification mark appears in the image irrespective of an orientation of the package to the camera, determining (603) if the image is valid or invalid, determining (604) if the image includes a barcode, with a processor and memory of the POS system, analyzing (605) the image to identify the identification mark on the package from the image, with the database, identifying (606) the contents associated with the package based on the identification mark from the image, and displaying (607), via a display of the POS system, a message associated with the contents of the package.

As mentioned above, the method (600) includes storing (601) information relating to a number of identification marks in a database, the information for each of the number of identification marks corresponds to contents of a number of packages. As mentioned above, the database stores information associated with contents of packages in memory. The information can be modified based on modifications to contents and/or packages.

As mentioned above, the method (600) includes determining (603) if the image is valid or invalid. In some examples, the method (600) cannot move onto the next step until a valid image is captured. As a result, a message is displayed to the user indicating to rescan the package until a valid image is captured by the camera.

As mentioned above, the method (600) includes determining (604) if the image includes a barcode. If the barcode is not present in the image, the method continues to the next step. However, if the image includes a barcode, the barcode is then used to identify the contents of the package. The image is analyzed such that the barcode can be read in the image.

As mentioned above, the method (600) includes with a processor and memory of the POS system, analyzing (605) the image to identify the identification mark on the package from the image. In some examples, the method (600) only needs to identify the identification mark on the package from the image. In other examples, the method (600) needs to identify the identification mark on the package from the image as well as the dimension of the package from the image.

As mentioned above, the method (600) includes displaying (607), via a display of the POS system, a message associated with the contents of the package. Messages are displayed, before, during, or after the identification process of the contents of the package.

Figure 7:
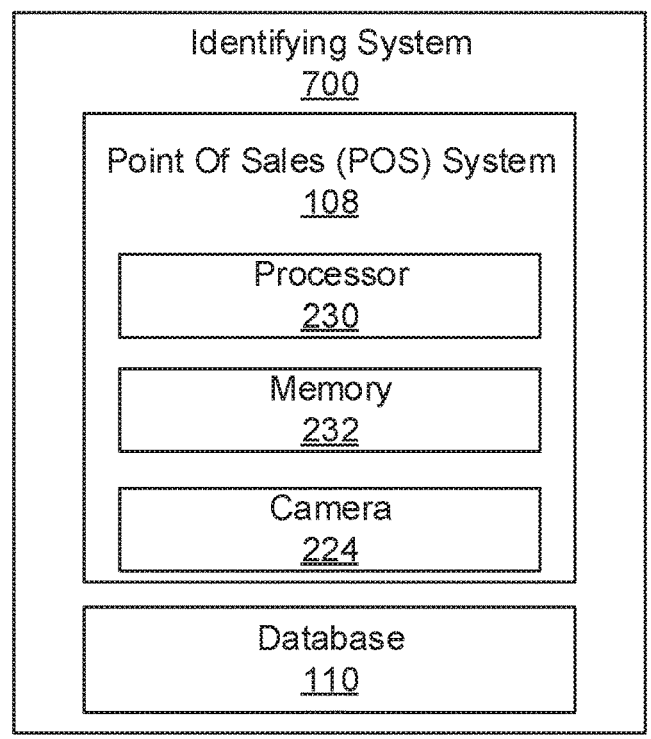
FIG. 7 is a diagram of an identifying system, according to one example of principles described herein.

FIG. 7 is a diagram of an identifying system, according to one example of principles described herein. As will be described below, an identifying system (700) includes a POS system (108) and a database (110).

As illustrated, the identifying system (700) includes a POS system (108). In this example, the POS system (108) includes a camera (224) to image the package (104), where the package (104) has an identification mark (116) thereon such that the camera (224) captures an image of the package (104) with the identification mark (116).

The POS system (108) includes a processor (230) and memory (232) to determine dimensions of the package (104) from the image. The processor (230) and the memory (232) are used to access a database (110).

The imaging (700) system includes the database (110). The database (110) is used to identify the contents (102) associated with the package (104) based on the identification mark (116) and dimensions of the package (104) determined from the image.

Figure 8:
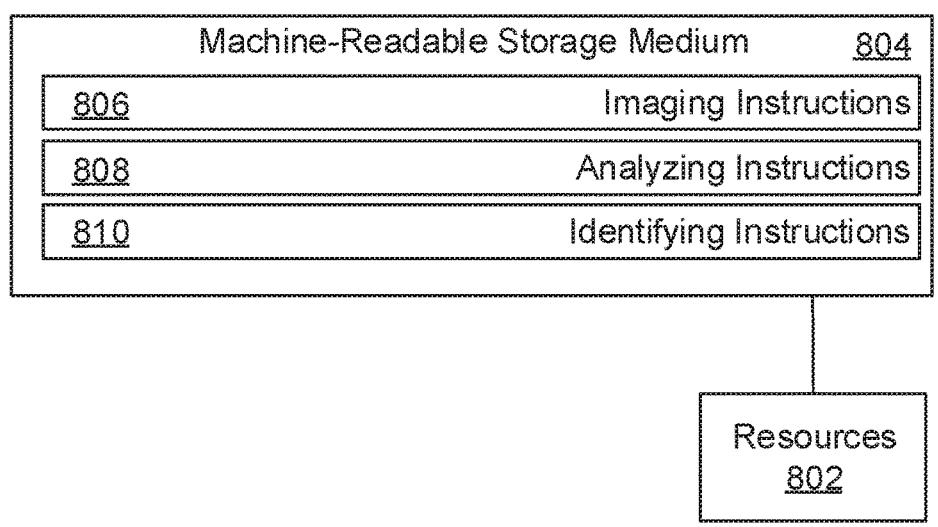
FIG. 8 is a diagram of an identifying system, according to one example of principles described herein.

FIG. 8 is a diagram of an identifying system, according to one example of principles described herein. In this example, the identifying system (800) includes resource(s) (802) that are in communication with a machine-readable storage medium (804). Resource(s) (802) may include one processor. In another example, the resource(s) (802) may further include at least one processor and other resources used to process instructions. The machine-readable storage medium (804) represents generally any memory capable of storing data such as instructions or data structures used by the identifying system (800). The instructions shown stored in the machine-readable storage medium (804) include imaging instructions (806), analyzing instructions (808), and identifying instructions (810).

The machine-readable storage medium (804) contains computer readable program code to cause tasks to be executed by the resource(s) (802). The machine-readable storage medium (804) may be tangible and/or physical storage medium. The machine-readable storage medium (804) may be any appropriate storage medium that is not a transmission storage medium. A non-exhaustive list of machine-readable storage medium types includes non-volatile memory, volatile memory, random access memory, write only memory, flash memory, electrically erasable program read only memory, or types of memory, or combinations thereof.

The imaging instructions (806) represents instructions that, when executed, cause the resource(s) (802) to image a package via a camera of a POS system, where the package has an identification mark thereon such that a camera captures an image of the package with the identification mark. The analyzing instructions (808) represents instructions that, when executed, cause the resource(s) (802) to analyze the image to identify the identification mark from the image and determine dimension of the package from the image. The identifying instructions (810) represents instructions that, when executed, cause the resource(s) (802) to identify contents associated with the package based on the identification mark and the dimensions of the package determined from the image.

Further, the machine-readable storage medium (804) may be part of an installation package. In response to installing the installation package, the instructions of the machine-readable storage medium (804) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the resource(s) (802) and the machine-readable storage medium (804) are located within the same physical component, such as a server, or a network component. The machine-readable storage medium (804) may be part of the physical component's main memory, caches, registers, non-volatile memory, or elsewhere in the physical component's memory hierarchy. Alternatively, the machine-readable storage medium (804) may be in communication with the resource(s) (802) over a network. Further, the data structures, such as the libraries, may be accessed from a remote location over a network connection while the programmed instructions are located locally. Thus, the identifying system (800) may be implemented on a user device, on a server, on a collection of servers, or combinations thereof.

The identifying system (800) of FIG. 8 may be part of a general purpose computer. However, in alternative examples, the identifying system (800) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

What is claimed is:
1. A method for imaging a package to identify contents associated with the package, the method comprising:
with a camera of a point of sale (POS) system, imaging the package, where an identical identification mark is located on multiple sides of the package;

with a processor of the POS system, determining dimensions of the package from the imaging of the package and differentiating between two packages having the same identification mark based on different dimensions of the two packages; and with a database, identifying the contents associated with the package based on the identification mark and dimensions of the package.

2. The method of claim 1, further comprising storing a location of the identification marks on each of the sides of the packages in the database.

3. The method of claim 1, wherein the database further stores a location of an information mark on at least one of the sides of the packages, the information mark being different from and additional to the identification mark of the package.

4. The method of claim 1, further comprising determining if the image is valid or invalid.

5. The method of claim 4, wherein the image is valid when a processor and memory of the POS system identifies the identification mark on the package from the image and determines dimensions of the package from the image; and wherein the image is invalid when the processor and the memory of the POS system does not identify the identification mark on the package from the image or does not determine the dimensions of the package from the image.

6. The method of claim 1, further comprising determining if the image includes a barcode.

7. The method of claim 3, with a processor and memory of the POS system, analyzing the image to identify the information mark on the package from the image, and linking to a coupon or loyalty workflow based on the information mark.

8. The method of claim 1, further comprising displaying, via a display of the POS system, a message associated with the contents of the package.

9. A system for imaging a package to identify contents associated with the package, the system comprising:

a point of sale (POS) system comprising:

a camera to image the package, where the package has an identification mark thereon such that the camera captures an image of the package with the identification mark; and a processor and memory to:

determine dimensions of the package from the image; and access a database; and the database to identify the contents associated with the package based on the identification mark and dimensions of the package determined from the image;

the processor and memory to further determine whether an information mark on the package is also in the image of the package; and when the information mark is in the image of the package, display, via a display of the POS system, additional information about the contents of the package based on the information mark.

10. The method of claim 1, further comprising:

determining whether an information mark on the package is also in the image of the package; and when the information mark is in the image of the package, displaying, via a display of the POS system, additional information about the contents of the package based on the information mark.

11. The system of claim 9, wherein the information mark is defined by a color, a shape, or a texture.

12. The system of claim 9, wherein the identification mark is defined by a color, a shape, or a texture.

13. A machine-readable, non-volatile storage medium encoded with instructions, the instructions executable by a processor of a system to cause the system to:

image a package via a camera of a point of sale (POS) system, where the package has an identification mark thereon such that a camera captures an image of the package with the identification mark;

analyze the image to identify the identification mark from the image and determine dimension of the package from the image; and identify contents associated with the package based on the identification mark and the dimensions of the package determined from the image;

wherein the identification mark is defined by a color, a shape, or a texture.

14. The method of claim 1, wherein the identification mark is defined by a color, a shape, or a texture.

15. The machine-readable, non-volatile storage medium of claim 13, further comprising instructions that, when executed, cause the processor to identify the identification mark in the image by:

segmenting the image into a number of regions;

identifying key points of the identification mark within the regions; and matching the key points of the identification mark in the image to predetermined key points to identify the identification mark.

16. The method of claim 1, further comprising using variable data printing to print a series of packaging, each package of the packaging being printed with a unique identification mark in multiple locations such that, when folded into a cuboid package the identical identification mark appears on each of the sides of the package.

17. The system of claim 9, the processor and memory to differentiate the contents of two packages that have the same identification mark based on different dimensions of the packages and using the database.

18. The system of claim 9, wherein the processor and memory further identify an information mark in the image of the package, where the database specifies a location on the package of the information mark.

19. The system of claim 9, wherein the processor and memory further identify an information mark in the image of the package and, based on the information mark, link the POS system to a coupon or loyalty workflow based on the information mark.

20. The machine-readable, non-volatile storage medium of claim 13, wherein the instructions executable by the processor further cause the system to: differentiate between two packages that have identical identification marks based on different dimensions of the two packages.

* * * * *